US 6,595,421 B2

(12) United States Patent
Detwiler

(10) Patent No.: US 6,595,421 B2
(45) Date of Patent: Jul. 22, 2003

(54) INTEGRATED ANTENNA SCANNER WINDOW

(75) Inventor: Paul O. Detwiler, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 149 days.

(21) Appl. No.: 09/774,909

(22) Filed: Jan. 31, 2001

(65) Prior Publication Data

US 2002/0100805 A1 Aug. 1, 2002

(51) Int. Cl.[7] ................................................ G06K 7/10
(52) U.S. Cl. .................. 235/462.14; 235/383; 235/385; 235/462.35; 235/462.46; 343/713
(58) Field of Search ........................ 235/462.14, 462.35, 235/383, 385, 462.46; 343/713; 29/600

(56) References Cited

U.S. PATENT DOCUMENTS

| 3,938,044 A | * | 2/1976 | Lichtblau | 340/572.3 |
| 4,141,078 A | | 2/1979 | Bridges, Jr. et al. | 364/900 |
| 4,567,473 A | | 1/1986 | Lichtblau | |
| 4,849,766 A | * | 7/1989 | Inaba et al. | 343/713 |
| 5,059,951 A | | 10/1991 | Kaltner | 340/572 |
| 5,187,354 A | * | 2/1993 | Bengtsson | 235/462.45 |
| 5,229,588 A | | 7/1993 | Detwiler et al. | |
| 5,315,096 A | | 5/1994 | Muller et al. | |
| 5,341,125 A | | 8/1994 | Plonsky et al. | |
| 5,355,144 A | * | 10/1994 | Walton et al. | 343/713 |
| 5,477,219 A | | 12/1995 | Zarembo et al. | |
| 5,594,228 A | | 1/1997 | Swartz et al. | |
| 5,594,231 A | * | 1/1997 | Pellicori et al. | 235/462.32 |
| 5,990,794 A | | 11/1999 | Alicot et al. | |
| 6,147,605 A | * | 11/2000 | Vega et al. | 257/679 |
| 6,304,182 B1 | * | 10/2001 | Mori et al. | 340/545.6 |

FOREIGN PATENT DOCUMENTS

JP 2000132647 A * 5/2000 .......... G06K/17/00

OTHER PUBLICATIONS

NCR, "7875 Scanner/Scale Checkpoint," Jan. 21, 1997, four–page exerpt.

* cited by examiner

Primary Examiner—Thien M. Le
Assistant Examiner—Steven S. Paik
(74) Attorney, Agent, or Firm—Francis L. Conte; Paul W. Martin

(57) ABSTRACT

A barcode scanner window includes a transparent window pane having an electrically connecting loop laminated to the back side thereof. The loop extends around the perimeter of the pane and includes opposite ends to which electrical leads are joined.

15 Claims, 4 Drawing Sheets

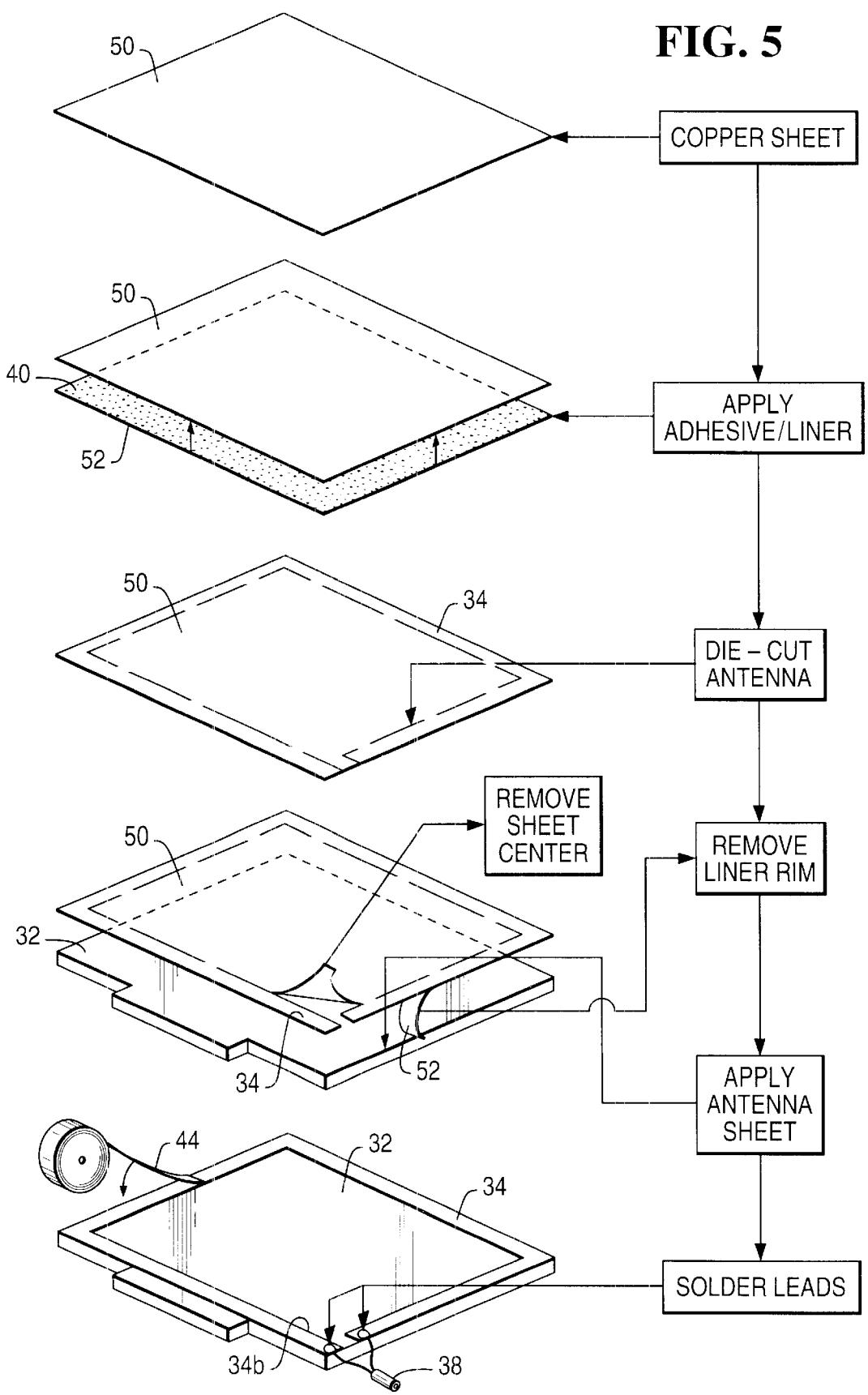

INTEGRATED ANTENNA SCANNER WINDOW

BACKGROUND OF THE INVENTION

The present invention relates generally to barcode scanners, and, more specifically, to security tag deactivation.

Security for commercial products in retail establishments may be provided by attaching thereto a security tag of various configurations. In one example, the security tag includes a resonant circuit with an integral capacitor which is effective for activating an alarm at a store exit when detected by corresponding equipment configured therefor. The security tag may be deactivated by a store clerk upon purchase of the attached product for permitting the product to be removed from the store without activating the alarm.

The tag is deactivated by transmitting a suitable signal from an antenna for short circuiting the capacitor to disable the resonant circuit. The antenna and corresponding deactivation system should be conveniently mounted at the typical transaction terminal in the store.

In one embodiment, a conventional barcode is applied to the security tag so that a barcode scanner of any suitable form may be used at the terminal for identifying the product attached thereto and completing the sales transaction. The deactivation antenna may be conveniently mounted in the barcode scanner for simultaneous deactivation of the security tag as the barcode is scanned and decoded.

The typical stand-alone barcode scanner is conveniently mounted in a counter and includes one or more transparent scanner windows through which a laser beam is projected in corresponding scanning lines for detecting the barcode as it is passed thereover. The security tag deactivation antenna may be conveniently mounted in the scanner housing around the boundary of one or more of the scanner windows.

The antenna is typically in the form of one or more loops of electrically conducting wire which must therefore be suitably mounted and secured in the scanner housing in close proximity to the scanner window. The scanner housing must therefore be suitably configured for mounting the antenna which correspondingly increases the complexity of the housing and the associated cost thereof.

Accordingly, it is desired to provide an improved security tag deactivation antenna integrated into a barcode scanner.

BRIEF SUMMARY OF THE INVENTION

A barcode scanner window includes a transparent window pane having an electrically connecting loop laminated to the back side thereof. The loop extends around the perimeter of the pane and includes opposite ends to which electrical leads are joined.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 5 is a flowchart method of making the integrated window illustrated in FIGS. 1–4 in accordance with an exemplary embodiment of the present invention.

DETAILED DESCRIPTION OF THE INVENTION

Figure 1:
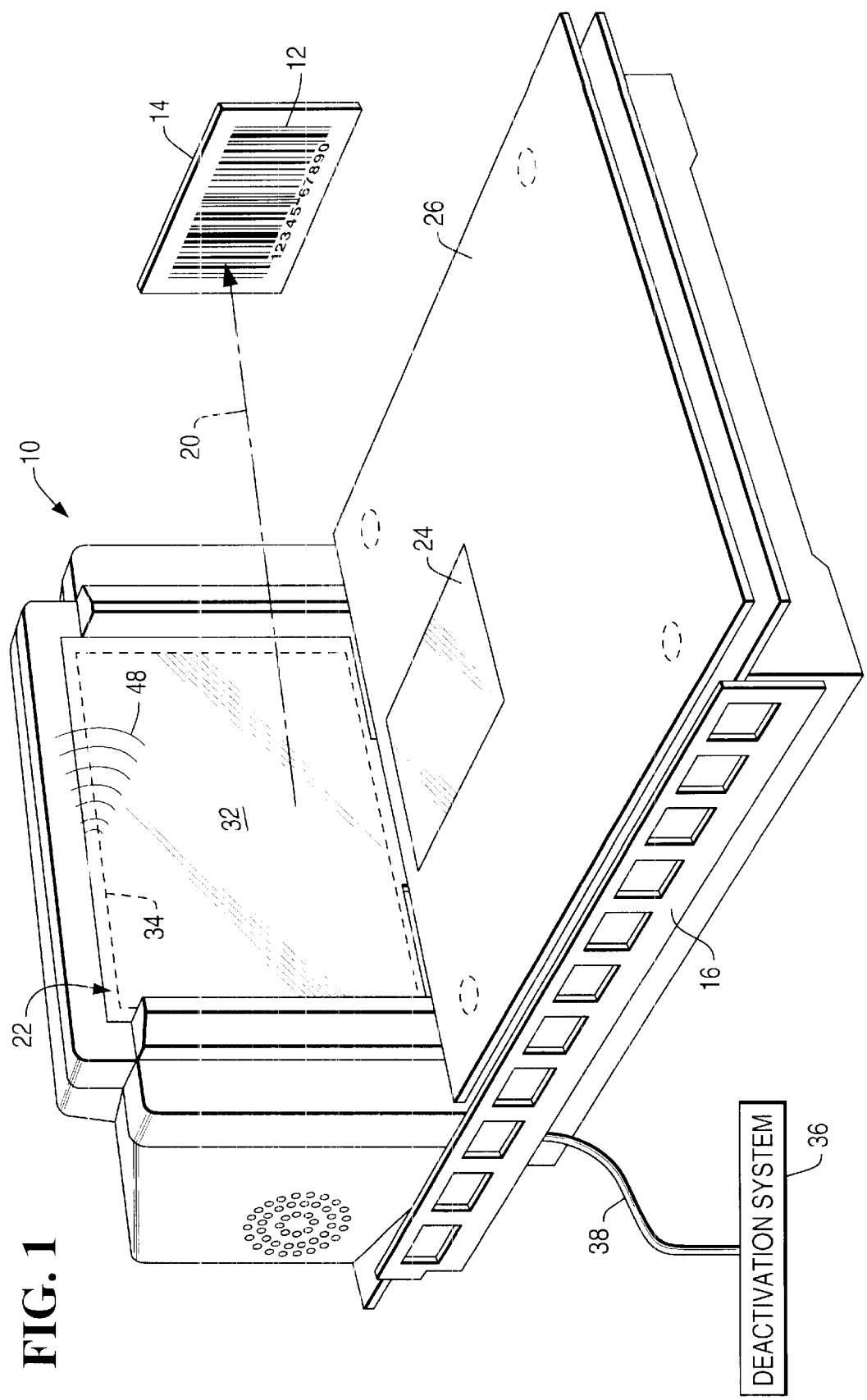
FIG. 1 is an isometric view of a barcode scanner in an exemplary configuration including a window having an integrated deactivation antenna therein.

Illustrated in FIG. 1 is a barcode scanner 10 for reading and decoding a barcode 12 applied to an electronic security tag 14. The tag is suitably attached to a product for sale (not shown) and the barcode identifies that product.

The barcode may have any conventional configuration such as the one-dimensional universal product code (UPC) form illustrated, with alternating dark lines and white spaces of varying width. The security tag may have any conventional configuration and, for example, includes an internal resonant circuit with an integral capacitor therein.

Figure 2:
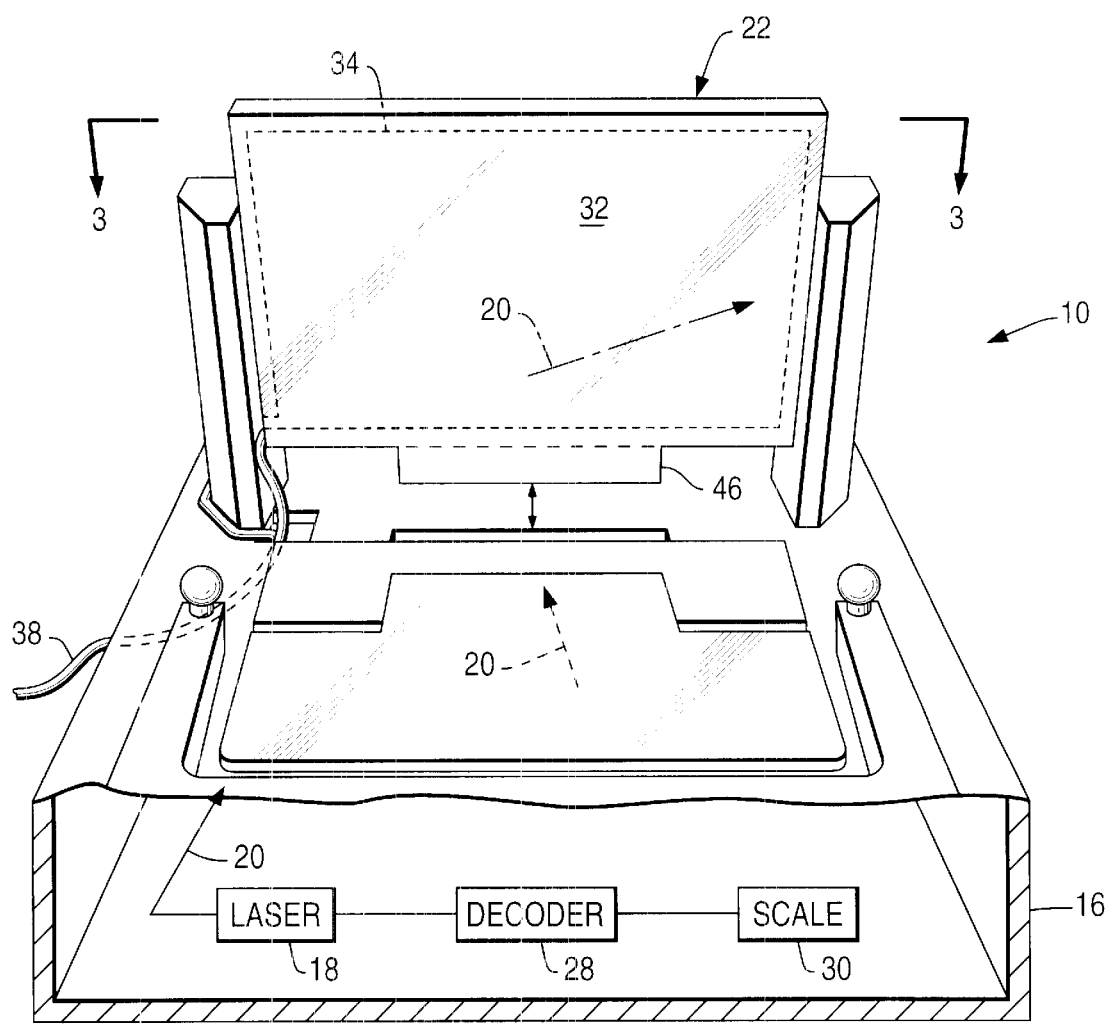
FIG. 2 is a front view of the barcode scanner illustrated in FIG. 1 showing assembly of the integrated window therein.

In the exemplary embodiment illustrated in FIGS. 1 and 2, the scanner 10 includes a housing 16 supporting therein all optical and electrical components of the scanner including a laser 18 for emitting a laser scan beam 20 for decoding the barcode.

As shown in FIG. 1, the scanner is in the exemplary form of a dual aperture optical scanner of the type disclosed in U.S. Pat. No. 5,229,588—Detwiler et al. In this configuration the scanner includes a vertical window 22 extending upwardly from an adjacent horizontal window 24 mounted in a scale plate or tray 26.

The scanner is illustrated in part assembly in FIG. 2 with the mounting bezel for the vertical window being removed, and the scale tray 26 being removed to expose a sub-window sealingly closing the operative optical elements within the housing. The laser typically cooperates with a rotary spinner for deflecting the laser beam off a plurality of pattern mirrors mounted inside the housing for segmenting the scan beam into short components which are projected in corresponding patterns through the vertical and horizontal windows for use in decoding the barcode in an efficient manner.

A conventional decoder 28 is mounted in the housing and includes a central processing unit for controlling operation of the scanner and decoding the returning laser beam through suitable collection optics. In the exemplary embodiment the scanner also includes an electronic scale 30 by which items placed atop the tray 26 in FIG. 1 may be weighed, as typically found in a supermarket application.

In the preferred embodiment illustrated in FIG. 1 the vertical window 22 is substantially larger than the horizontal window 24 and includes an optically transparent flat window pane 32 of any suitable material, such as glass or plastic, for transmitting the laser scan beam therethrough to intercept the barcode as it is passed thereover.

In accordance with the present invention, an electrically conducting loop 34 is integrated directly with the pane 32 for providing an antenna. The antenna loop 34 is electrically joined to a deactivation system 36 for deactivating the security tag 14 simultaneously with the decoding of the barcode as the tag and barcode are passed in front of the vertical window during operation.

The deactivation system may have any conventional form which cooperates with the security tag 14, both of which are described in U.S. Pat. No. 5,059,951 in a typical example. One system is commercially available from Checkpoint Systems Inc. of Thorofare, N.J., under the trademark Counterpoint Deactivation System. This system requires a suitable antenna for radiating an electrical signal to short circuit the capacitor in the security tag for deactivation thereof.

In accordance with the present invention, the loop antenna 34 integrated into the window 22 may be electrically connected to the deactivation system 36 in an improved combination therewith.

As initially shown in FIG. 2 the vertical window 22 is an integrated assembly of the window pane 32 and the antenna loop 34 which is readily assembled to or disassembled from a corresponding mounting seat in the housing and retained in place by a suitable bezel, shown assembled in FIG. 1 and removed in FIG. 2. The vertical window 22 is illustrated in isolation in FIG. 3.

The antenna loop 34 is laminated to the back side of the pane around a perimeter thereof, and includes adjacent opposite ends 34a,b with a small space or gap therebetween which interrupts the circumferential continuity of the otherwise continuous loop. A pair of electrical wires or leads 38 are fixedly joined to corresponding ones of the loop ends in an electrical circuit therewith.

The two leads may be contained in a common insulating sleeve and have any suitable length for reaching the deactivation system 36 illustrated in FIG. 1 which may be disposed at any convenient location, typically outside the scanner housing in view of the compact nature of the scanner housing itself. The ends of the electrical leads may be formed with a suitable electrical connector for permitting easy connection or disconnection from a corresponding electrical connector provided in the deactivation system.

Figure 4:
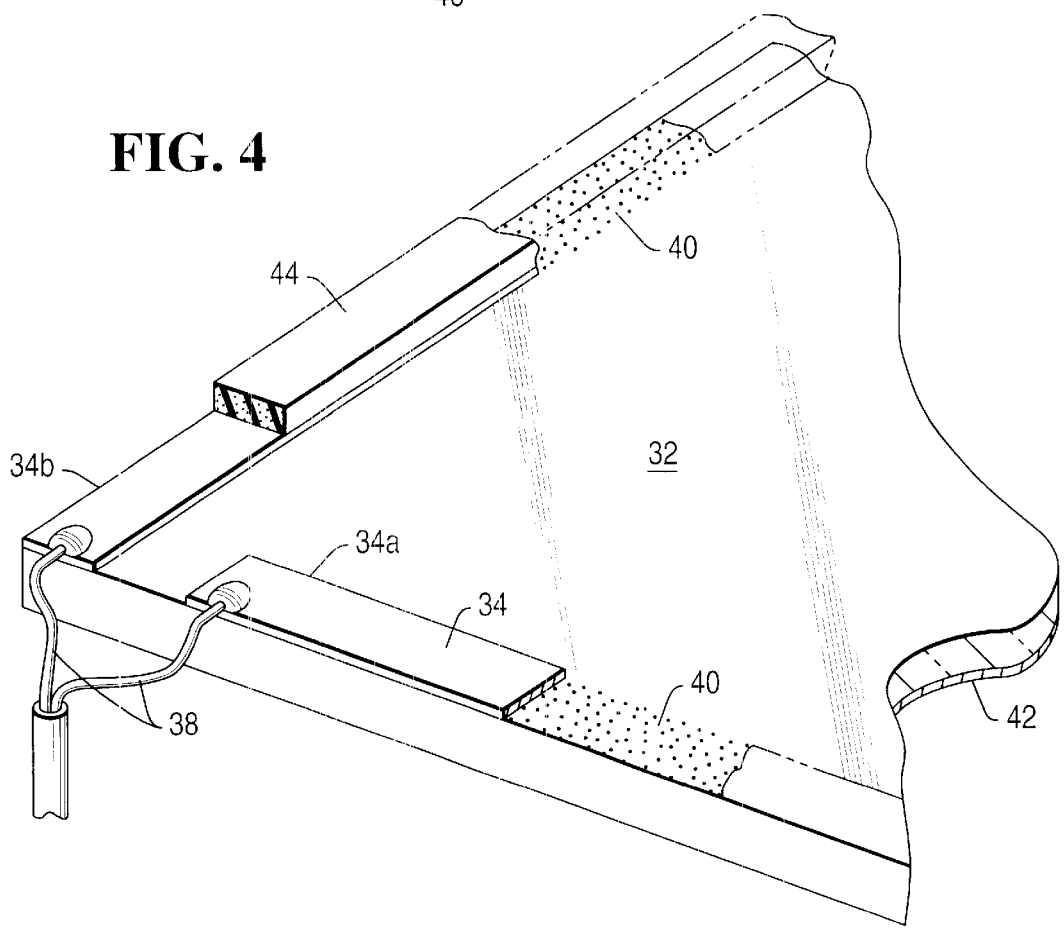
FIG. 4 is an enlarged isometric view of a corner of the window illustrated in FIG. 3 within the dashed circle labeled 4 with corresponding electrical leads attached to opposite ends of the antenna loop.

Of particular significance in the present invention is the direct integration of the antenna loop 34 with the window pane 32 as illustrated in more detail in FIG. 4. Since the scanner and housing itself are made as small and compact as possible for suitably supporting the operative features thereof, little, if any, space is available for conveniently mounting the antenna for the deactivation system.

In previous applications, a wire antenna may be placed inside a supporting channel in the underside of the housing surrounding a scanner window, and then clamped or bonded therein. This introduces additional complexity to the housing of the scanner for mounting such a wire and increases cost thereof.

Furthermore, scanner windows are typically configured as small as possible while permitting the transmission of the desired scan line pattern in height and width. The deactivation antenna should be incorporated into the housing without interference or blocking of the scan line pattern which adds to the complexity of its integration.

The deactivation system and the scanner are typically manufactured by two different manufacturing companies and are separately optimized for their own operation. Any changes in the barcode scanner for mounting the deactivation antenna therein add to the complexity and cost of the resulting assembly thereof.

In accordance with the present invention, the antenna loop 34 is integrated with the window pane and does not otherwise affect the configuration of the overall barcode scanner nor require any corresponding changes therefor. The antenna loop is integrated with the window pane and becomes a part thereof which is readily assembled to or disassembled from the barcode scanner without affecting its configuration.

Figure 3:
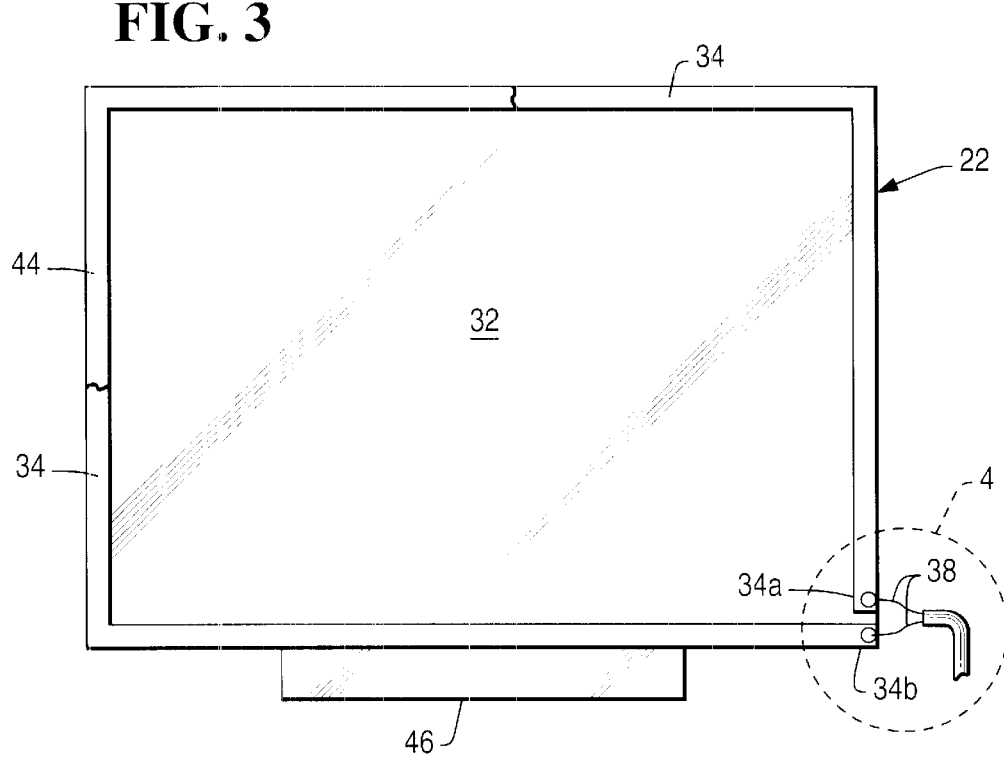
FIG. 3 is a plan view of the back side of the integrated window illustrated in FIG. 2 and taken along line 3—3 showing an antenna in accordance with an exemplary embodiment of the present invention.

In the preferred embodiment illustrated in FIGS. 3 and 4, the antenna loop 34 is in the form of a copper foil ribbon laminated directly atop the back side of the window pane 32 by a suitable adhesive 40 formed in a thin layer therebetween.

As shown in FIG. 3 the pane 32 is rectangular in a preferred form, and the ribbon loop 34 preferably borders the pane perimeter along the four sides thereof in a single or coplanar loop having flat corners. This configuration provides electrical continuity around the corners of the pane with flat, unfolded ribbon sections at the pane corners.

In the exemplary embodiment illustrated in FIG. 4, the window pane 32 is a suitable optically transparent plastic such as cyro acrylite, and preferably includes an abrasion resistant coating 42 on the front side thereof. The coating may have any conventional composition and protects the front side of the window pane from abrasion as the barcode tags or products are slid across the window during use. The back side of the pane is preferably uncoated for reducing manufacturing costs, as well as decreasing the cost of integrating the antenna loop therein.

As shown in FIG. 4 the ribbon loop 34 is preferably formed of thin copper foil with a rectangular cross section having an area substantially equal to 18-gauge wire for providing enhanced performance over typical deactivation antennas formed of smaller gauge wire, such as 24-gauge (AWG). In an exemplary embodiment the foil is 5 mils (0.127 mm) thick and 0.25 inch (6.4 mm) wide and borders the pane perimeter with little or no side clearance therewith.

The antenna loop 34 may be protected by adhesively bonding thereatop a foam tape 44 which follows the rectangular configuration of the loop. The tape is illustrated in part in FIGS. 3 and 4 but preferably completely covers the full rectangular configuration of the underlying antenna loop 34 between the opposite loop ends 34a,b and the electrical connections thereat. Another advantage of the foam tape 44 is that it provides a resilient support and gasket for the vertical window 22 illustrated assembled in the scanner in FIG. 1. The perimeter of the window pane is thusly supported on the resilient foam tape 44 and held in position in the scanner behind the removable bezel suitably attached thereto.

As initially shown in FIG. 3, the window pane 32 preferably includes an integral tab 46 projecting laterally outwardly or downwardly and coplanar with the pane along the bottom edge thereof. As shown in FIGS. 2 and 3, the loop ribbon 34 is disposed along the pane inboard of the tab at the base of the pane itself. In this way, the tab 46 as illustrated in FIG. 2 may be used for assembling and retaining the vertical window in its mounting seat, with the tab 46 being disposed in a corresponding socket formed in the scanner housing. The tab positions and retains the bottom portion of the window, with the top portion thereof being simply retained in the housing using a pair of conventional retention clips mounted behind the window bezel.

As shown in FIG. 3, the tab 46 preferably projects downwardly from the bottom edge of the window pane, and the loop ends 34a,b are disposed at a common bottom corner of the pane. In this way, the leads 38 may be readily routed through the scanner housing as illustrated in FIG. 2 and out a suitable aperture in the side thereof for being connected to the separately provided deactivation system 36.

The fundamental design of the barcode scanner illustrated in FIGS. 1 and 2 is not effected in any manner for accommodating the introduction of the antenna loop 34. The foil loop antenna laminated to the window pane does not appreciably affect its thickness and requires no modification of the window seat in the scanner housing.

In this manner, the barcode scanner may conveniently introduce the deactivation antenna loop 34 for connection with the deactivation system 36 if desired. This is readily accomplished by simply connecting the provided electrical leads 38 from the antenna loop to the deactivation system.

Accordingly, during operation, the deactivation system 36 is electrically joined to the antenna loop 34 for radiating or emitting a deactivation signal 48 from the loop which is effective to deactivate the electronic tag 14 when passed in suitably close proximity to the window 22. Since the tag carries the barcode 12, the barcode must be passed sufficiently close to the scanner window for traversing the scan beam thereacross for decoding thereof. Simultaneously, the adjoining tag 14 comes within the electromagnetic field of the antenna loop for short circuiting the capacitor in the resonant circuit of the tag for deactivation thereof.

In the preferred embodiment the antenna ribbon 34 forms a single loop coextensively bordering the rectangular perimeter of the window pane 22 with little or no edge clearance therewith. In this way, maximum area of the window pane is provided through which the scan beam may be emitted, while the returning scan beam is collected by the corresponding optics inside the scanner. The antenna loop does not decrease the effective area of the window pane provided for the desired scan line pattern, yet closely surrounds the pane for maximizing the field strength of the deactivation signal.

FIG. 5 illustrates in flowchart form a preferred method of making the vertical window 22 illustrated in FIGS. 1–4 with the integrated antenna loop therein. A sheet 50 of electrically conducting metal, such as copper foil, is initially provided for use in forming a single plane, flat antenna loop. A sheet of adhesive 40 is suitably laminated with the metal sheet 50. This may be conveniently effected by using a conventional release liner 52 which is typically silicone impregnated having the adhesive 40 coated thereon with a weak bond. The adhesive is then sandwiched between the copper sheet 50 on one side and the release liner 52 on the opposite side.

The laminated metal sheet is then die-cut to form the electrically conducting loop 34 in any desired configuration, such as the rectangular configuration illustrated, and in a single plane with coplanar or flat corners in the preferred embodiment. The die-cut is preferably interrupted at several locations along the inner perimeter of the loop to maintain un-cut ties between the loop and the center region of the sheet which maintains structural integrity of the sheet center and its rim antenna loop.

The rim of the liner 52 below the die-cut loop 34 is then suitably removed or separated therefrom to expose the adhesive 40 which has been transferred from the liner to the underside of the metal foil having a greater adhesion than that with the liner. The entire sheet with the adhesive exposed below the antenna loop is then applied atop the window pane 32 and simply bonded thereto using the same adhesive 40 carried by the underside of the loop. The sheet center is then removed by being torn at the ties, and the remaining antenna loop is thusly permanently bonded to the back side of the pane.

The electrical leads 38 may then be suitably connected to the loop ends by any convenient manner, such as by soldering. Since the foil is thin, little heat is required for soldering the electrical leads thereto without damage to the underlying adhesive or plastic window pane.

Finally, the foam tape 44 may then be adhesively bonded around the perimeter of the window pane directly above and covering the full perimeter extent of the antenna loop 34. As indicated above, the foam tape protects the loop antenna and provides a resilient support for mounting the window pane in its seat in the scanner housing.

Since the vertical window 22 illustrated in FIG. 1 is substantially larger than the horizontal window 24, the deactivation antenna 34 is preferably formed around the perimeter of the vertical window for increasing its field of coverage and the corresponding electromagnetic signal transmitted therefrom. Alternatively, the antenna loop could otherwise be integrated to the underside of the horizontal window 24, if desired. However, since the horizontal window is mounted in the removable tray 26 and has a substantially smaller area, it is not desirable to integrate the antenna therein.

The antenna could also be integrated in the subwindow disposed below the horizontal window illustrated in FIG. 2 which remains fixed in the scanner housing and has a larger available area for mounting the antenna. In yet another embodiment, antennas may be mounted in two or more windows in the scanner as desired.

The copper foil loop antenna described above has several advantages over typical antenna wires in round form. The foil loop may be easily fabricated in the die-cut process illustrated in FIG. 5. The foil loop has an extremely thin or compact profile and is introduced without affecting the overall configuration of the window pane. And, the foil loop permits a substantial increase in electrical conducting cross sectional area thereof without significantly affecting the overall size of the section for providing improved radiation performance as compared with smaller gauge round wire previously used for antennas.

And, the foil antenna may be provided by the manufacturer of the barcode scanner as an option in the event that the scanner will be used in combination with the separately manufactured and provided deactivation system. Overall system cost may be reduced by the efficient introduction of the foil antenna in the scanner window independently from manufacture of the deactivation system.

Performance of the combined system may be optimized without otherwise affecting the configuration of the scanner housing for introducing an antenna therein. Neither the nominal configuration of the vertical window nor its size is appreciably changed with the introduction of the thin integrated loop antenna therein which correspondingly reduces the expense of introducing an effective deactivation antenna into a barcode scanner of this form.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A barcode scanner window comprising:
   a transparent window pane for transmitting a laser scan beam therethrough, wherein said pane is rectangular and is made of plastic, and includes an abrasion resistant coating on a front side thereof and an integral tab projecting laterally outwardly along one edge thereof;
   an electrically conducting loop laminated to a back side of said of said pane around a perimeter thereof, and including adjacent opposite ends, wherein said loop comprises a foil ribbon laminated to said pane by an adhesive therebetween, wherein said ribbon borders said pane perimeter along four sides thereof in a coplanar loop having flat corners, and wherein said ribbon is disposed along said pane inboard of said tab; and electrical leads fixedly joined to said loop ends.

2. A window according to claim 1 wherein said ribbon has a cross sectional area substantially equal to 18-gauge wire.

3. A window according to claim 1 further comprising a strip of foam tape adhesively bonded atop said loop ribbon around said pane perimeter.

4. A window according to claim 1 wherein said tab projects downwardly from a bottom edge of said pane, and said loop ends are disposed at a common bottom corner of said pane.

5. A window according to claim 1 further comprising a deactivation system connected to said electrical leads, and configured for radiating a signal from said loop to deactivate an electronic tag carrying a barcode thereon.

6. A window according to claim 1 wherein said ribbon forms a single loop coextensively bordering said pane.

7. A barcode scanner comprising:

a housing including a laser for emitting a laser scan beam for decoding a barcode disposed atop an electronic tag;

a transparent window pane mounted vertically in said housing for transmitting said scan beam therethrough, wherein said pane is rectangular and is plastic, and includes an abrasion resistant coating on a front side thereof;

an electrically conducting loop laminated to a backside of said pane around a perimeter thereof, and including adjacent opposite ends, wherein said loop comprises a foil ribbon laminated to said pane by an adhesive therebetween and bordering said pane perimeter along four sides thereof in a coplanar loop having flat corners, and wherein said ribbon forms a single loop coextensively bordering said pane and has a cross sectional area substantially equal to 18-gauge wire;

a deactivation system connected to said loop to deactivate said electronic tag; and electrical leads fixedly joined to said loop ends and to said deactivation system.

8. A method of making a window of a barcode scanner comprising the steps of:

laminating a sheet of adhesive with a sheet of electrically conducting metal;

cutting said laminated metal sheet to form an electrically conducting loop including a foil ribbon having adjacent opposite ends;

adhesively bonding said loop to a back side of a transparent window pane around a perimeter thereof; and connecting electrical leads to said adjacent opposite ends.

9. A method according to claim 8 wherein said adhesive is provided on a release liner, and said liner is laminated to said metal sheet.

10. A method according to claim 9 wherein said laminated metal sheet is die-cut to form said loop in a single plane.

11. A method according to claim 10 wherein said liner is removed from said die-cut loop to expose said adhesive, and said adhesive loop is applied to said pane and bonded thereto.

12. A method according to claim 11 wherein said leads are connected to said loop ends by soldering.

13. A method according to claim 12 wherein said loop is die-cut from said laminated metal sheet in a rectangular configuration having coplanar corners.

14. A method according to claim 13 further comprising adhesively bonding a foam tape atop said loop bonded to said pane following said rectangular configuration thereof.

15. A barcode scanner window comprising:

a transparent window pane for transmitting a laser scan beam therethrough, wherein said pane is rectangular and is made of plastic, and includes an abrasion resistant coating on a front side thereof;

an electrically conducting loop laminated to a back side of said of said pane around a perimeter thereof, and including adjacent opposite ends, wherein said loop comprises a foil ribbon laminated to said pane by an adhesive therebetween, wherein said ribbon borders said pane perimeter along four sides thereof in a coplanar loop having flat corners, and wherein said ribbon has a cross sectional area substantially equal to 18-gauge wire; and electrical leads fixedly joined to said loop ends.

* * * * *